United States Patent [19]

Schrott et al.

[11] Patent Number: 5,680,106

[45] Date of Patent: Oct. 21, 1997

[54] MULTIBIT TAG WITH STEPWISE VARIABLE FREQUENCIES

[75] Inventors: Alejandro Gabriel Schrott, New York; Richard Joseph Gambino, Stony Brook; Robert Jacob von Gutfeld, New York, all of N.Y.

[73] Assignee: International Business Machines Corporation, Armonk, N.Y.

[21] Appl. No.: 549,288

[22] Filed: Oct. 27, 1995

[51] Int. Cl.$^6$ ................................ G08B 13/14
[52] U.S. Cl. ............ 340/572; 340/825.54; 342/44; 342/51
[58] Field of Search ............... 340/572, 825.54; 342/42, 44, 51; 235/380

[56] References Cited

U.S. PATENT DOCUMENTS

| | | | |
|---|---|---|---|
| 3,500,373 | 3/1970 | Minasy | 340/572 |
| 4,745,401 | 5/1988 | Montean | 340/572 |
| 5,081,445 | 1/1992 | Gill et al. | 340/572 |
| 5,103,210 | 4/1992 | Rode et al. | 340/572 |
| 5,111,186 | 5/1992 | Narlow et al. | 340/572 |
| 5,218,189 | 6/1993 | Hutchison | 340/572 X |
| 5,257,009 | 10/1993 | Narlow | 340/572 |
| 5,446,447 | 8/1995 | Carney et al. | 340/572 |
| 5,450,086 | 9/1995 | Kaiser | 342/42 |

FOREIGN PATENT DOCUMENTS 0663747  7/1995  European Pat. Off. .

Primary Examiner—Thomas Mullen
Attorney, Agent, or Firm—Louis J. Percello

[57] ABSTRACT

A transponder is disclosed comprising a resonant RLC circuit with one or more components that can be connected or disconnected non-destructively using switches that respond to an externally applied magnetic field. The switching in or out of the components causes a change in the resonant frequency of the original RLC circuit that is detected by the base station sweeping a carrier signal through a range of frequencies to detect a returned signal that changes when the carrier signal frequency matches the resonant frequency of the resonant circuit/tag. The resonant frequency changes when one or more of the circuit components is connected or disconnected. Each switch transfers at a unique magnetic field intensity so that electrical contact is achieved at a predetermined value of an externally applied magnetic field. The detected changes are used to create a code that is used to pass information from the resonant circuit/tag to the base station.

24 Claims, 12 Drawing Sheets

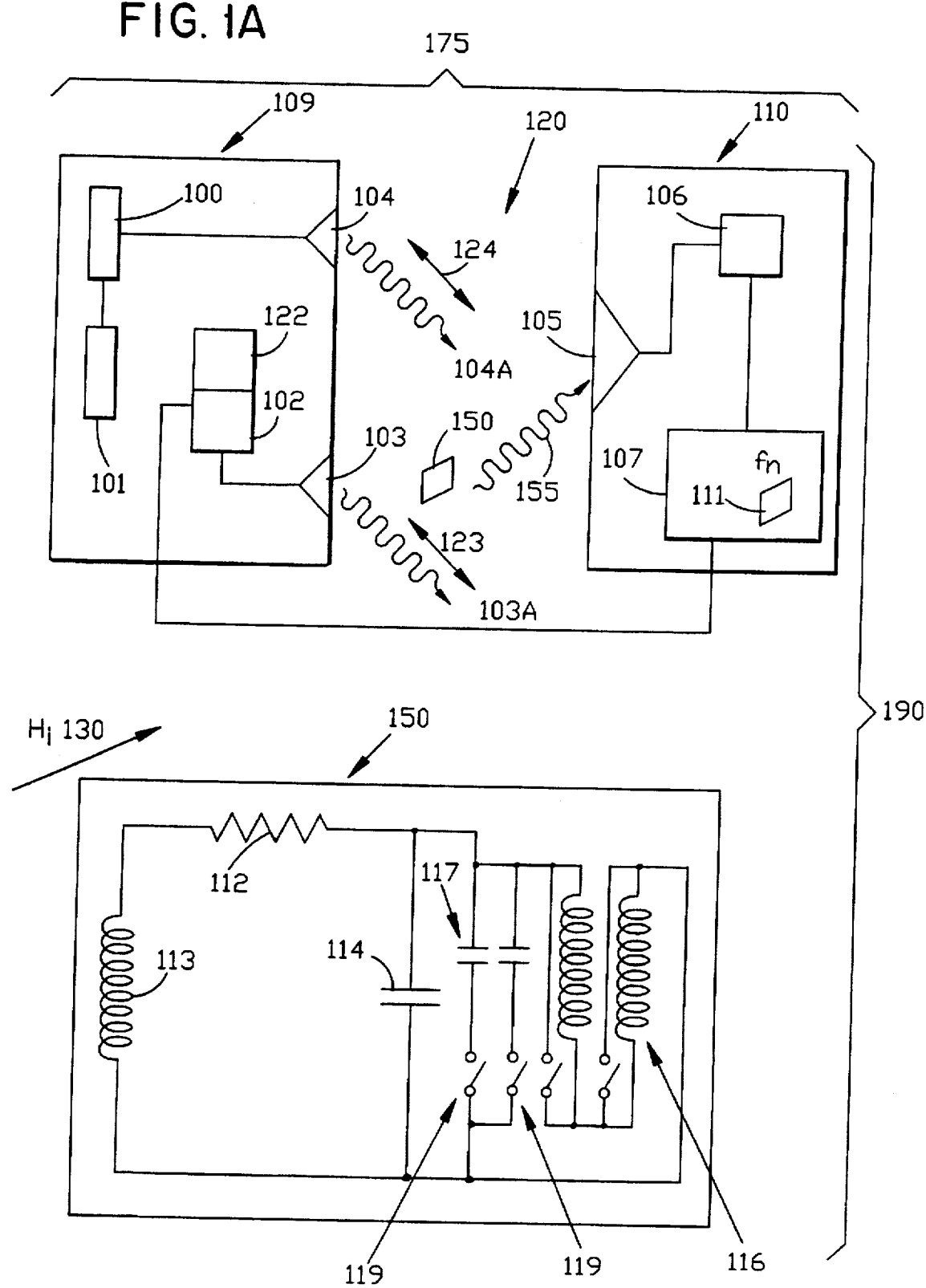

CARRIER ABSORPTION

MULTIBIT TAG WITH STEPWISE VARIABLE FREQUENCIES

FIELD THE INVENTION

This invention relates to radio frequency tagging. More specifically, the invention relates to a radio frequency tag that can change its resonance frequency in a step wise manner.

BACKGROUND OF THE INVENTION

A resonant circuit is one in which the values of circuit resistance, R, capacitance, C, and inductance, L, are chosen such that the reactance of the resonant circuit is a minimum at a resonant frequency.

In prior tagging art, a resonant circuit is disposed on a thin insulating dielectric substrate to form a tag for use in electronic article detection (EAS) schemes. Generally, the coil of the resonant circuit consists of a closed loop of a conducting element which has a certain value of resistance and inductance. A capacitive element which forms part of this closed loop consists of two separate areas of thin metal conducting film disposed on opposite sides of the dielectric. The tag is attached to articles to be protected from theft. An RF signal at or near the resonant frequency of the resonant circuit is emitted from a base station. When the tag is in the RF field, the tag's absorption can lead to a change in the tank circuit current of the base station and a power dip in a receiving coil. Either one of these two effects can be used to sense the presence of the tag and hence the item to which it is attached. Thus, an alarm can be made to sound when either of these effects are sensed by a pickup coil or by an amplifier, indicating improper removal of an item. To deactivate the tag, a relatively high RF power pulse can be applied at the counter at which the point-of-sale of the item takes place. This high power acts to short the capacitor or burn out a weak portion of the coil. In either case, the circuit is no longer resonant and will not respond to the RF interrogation from the base station. Therefore, the customer who has made a legitimate purchase at the point-of-sale counter can pass through the interrogation-sensing gate without setting off an alarm.

It is clear from this description that these tags, once deactivated, are not reusable. In addition, in the configuration just described, the tags are capable of only conveying one bit of information. Thus, they cannot give any information regarding the item's identification and are useful only for anti-theft applications. This kind of tag is normally classified as a single bit tag.

Some RF tags consist of a resonant coil or a double sided coil containing two thin film capacitors with the plate of each capacitor on opposite sides of the dielectric. Such tags can be used for source tagging and have an initial frequency that is different from the frequency used at the retail establishment for theft protection. For example, in U.S. Pat. No. 5,081,445 (assigned to Checkpoint), the tag is designated as being in a deactivated state until the first capacitor is shorted by means of a high power RF pulse at the then resonant frequency. Disabling the capacitor shifts the resonant frequency of the RF circuit to the store interrogation frequency. A second deactivation pulse is used to disable the second capacitor at the point-of-sale when payment is received for the item to which the tag is attached. At this stage, the tag is no longer usable and has been permanently destroyed.

Some additional prior art discloses two or more frequencies that can be obtained on a RF coil tag by altering the capacitance of the circuit. In one case, a strong DC electric field is applied to change the effective dielectric constant of the capacitor. Thus, the circuit has two resonant frequencies depending on the value of the applied electric field. Due to the ferroelectric hysteresis, the tag can be deactivated by the application of a DC field. However, it can also be reactivated and hence re-used by applying a DC field of opposite polarity (U.S. Pat. No. 5,257,009, assigned to Sensormarie). In an earlier embodiment, a set of capacitors connected in parallel attached to an inductance have been described in U.S. Pat. No. 5,111,186 assigned to Sensormatic in which each dielectric of the set of capacitors varies in thickness. In this manner, a series of resonant frequencies can be obtained by applying different voltages (electric fields). Each of the capacitors then changes capacitance at a different electric field (voltage) levels depending on the thickness of the dielectric. There can be some concern regarding the high voltages required for creating the change in the dielectric. Also, using this apparatus, the remanent state of ferroelectrics tends not to be very stable for long periods of time. Additional concern relates to the dielectrics, which are also piezoelectric materials which have properties quite sensitive to stress.

U.S. Pat. No. 5,218,189, assigned to Checkpoint, consists of an array of series capacitors connected in parallel with an inductor. Here, the resonance can be altered by selectively shorting one or more of the capacitors, thereby changing the resonant frequency of the resulting circuit. A frequency code can thereby be established by disabling or burning out selective capacitors at the time of interrogation, those capacitors becoming disabled which at the time of manufacture of the tag were "dimpled". The disadvantage is that the item or person is subject to high r.f. Fields during interrogation. The tag is also not reusable once scanned since the code relies on burning out a capacitor during the scan cycle and observing the change in frequency. Thus, once the tag has been queried its capacitive elements become irreversibly shorted and hence the tag cannot be scanned again.

U.S. Pat. No. 4,745,401 describes an embodiment for a reusable tag. It is comprised of two ferromagnetic elements, one soft (low coercivity) and one hard (high coercivity) both physically covering a portion of an R.F. coil. The ferromagnetic element with high coercivity can be magnetized to apply a bias field to the soft material to put the latter into saturation. In that state, the R.F. field generates very small hysteresis losses leading to a relatively high Q of the tag circuit. On the other hand, when the hard magnet is demagnetized, the RF field results in hysteresis losses in the soft material which lowers the Q of the circuit. This change in Q can be used to determine whether a tag is active or has been deactivated. While this constitutes a reusable tag, the change in Q is likely to be small and hard to distinguish from other effects that attenuate the absorption.

In U.S. Pat. No. 3,500,373 an apparatus is described for interrogating and sensing the presence of a RF resonant tag. Here the interrogating frequency is swept around a center frequency. In general, there is very little radiation emitted except when the tag is present in the field of the emitter. Thus, when there is no tag in the antenna field, very little energy is lost from the antenna circuit. When the swept frequency coincides with the resonant frequency of an active tag, energy is absorbed and a sensing circuit detects a drop in voltage level in the interrogating antenna oscillator circuit. The tag absorption occurs twice with every complete sweep cycle resulting in a negative dip in the oscillator circuit. The negative dip causes pulse modulation which is filtered, demodulated and amplified to cause an alarm to be activated, indicating theft of an item. Thus, the basic detection is achieved by varying the interrogation carrier frequency to match the resonance of a tag whose center frequencies span a range depending on the type or make of tag.

STATEMENT OF PROBLEMS WITH THE PRIOR ART

As already stated, the above prior art senses changes in the resonant state of a tag, either by changing its Q or changing the resonant frequency of the tag circuit. The prior art tags are detected by way of sensing the change in the magnitude of the tag absorption at the resonant frequency or a change in the Q of the tag circuit. However, it may be hard to distinguish a change in Q from a change in position or orientation of the tag relative to the RF field direction.

Prior art tags can produce weak signals that are difficult to discriminate at the base station (transceiver).

Many of the prior art RF tags are limited to one bit of information and are not reusable.

The reusable tags in the prior art (U.S. Pat. Nos. 5,257,009 and 5,111,186 assigned to Sensormatic) both require the use of very strong DC electric fields to change the dielectric constants of the capacitors used to shift the resonant frequency. This is impractical and may pose health threats to humans in close proximity to the tags.

Other prior art discloses multibit capability that relies on shorting an array of capacitors by applying a high intensity RF field. This prior art is impractical since the process of establishing code of the tag is destructive and thus does not permit repetition of the interrogation of the change in the frequency sequence. Because the process of changing the capacitance (and the accompanying resonance) is destructive, the tag is not reusable.

OBJECTS OF THE INVENTION

An object of this invention is an improved radio frequency (RF) tag transponder.

An object of this invention is an improved, reusable RF tag with one or more bits of information.

Another object of this invention is an improved, reusable RF tag that creates a dependable and easy to discriminate signal at the base station.

Another object of this invention is to create an RF tag with a multibit code consisting of a set of RF frequencies whose presence or absence determines the code.

SUMMARY OF THE INVENTION

The present invention is a transponder apparatus that uses an RLC resonant circuit that has one or more circuit components switched in or out of (added to or deleted from) the resonant circuit. Typically, the circuit components are added to or deleted from the resonant circuit by switches in the resonant circuit that are controlled by a remote, externally applied, varying magnetic field. Each time a circuit component is switched in or out of the resonant circuit, the resonant frequency of the resonant circuit shifts because the total capacitance and/or inductance of the resonant circuit changes. Therefore, a set of resonant frequencies (frequency set) for the resonant circuit can be produced by adding (deleting) a set of one or more circuit components as the magnetic field varies. A base station interrogates the resonant circuit by sweeping the frequency of an RF carrier signal over a range of frequencies at which the resonant circuit can resonate in order to determine each of the resonant frequencies in the frequency set. Note that the sweep rate of the RF carrier is greater than or equal to that of the ramping rate of the magnetic field. The resonant frequency (or frequency set) of the resonant circuit produces a signal with a high signal to noise ratio that the base station detects. The frequency set is a code (of one or more bits) that passes information from the resonant circuit (tag) to the base station. The resonant circuit can be reused because none of the circuit components or switches are destroyed during programming or interrogation.

In one preferred embodiment, the system and one or more resonant circuits (tag/transponder) are used for antitheft protection as well as item identification. In addition, the system includes means for interrogating and detecting the device to retrieve the information carried by the tag to identify and/or describe objects with which the tag is associated.

BRIEF DESCRIPTION OF THE DRAWINGS

The foregoing and other objects, aspects and advantages will be better understood from the following detailed description of preferred embodiments of the invention with reference to the drawings as follows:

FIG. 1A is a diagram of hardware for a preferred base station used to excite a resonant (RLC) circuit of a remote transponder with an RF carrier frequency and a time varying (e.g. ramped) magnetic field to activate the individual magnetic switches to connect/disconnect individual circuit components to the RLC circuit.

DETAILED DESCRIPTION OF THE INVENTION

Figure 1B:
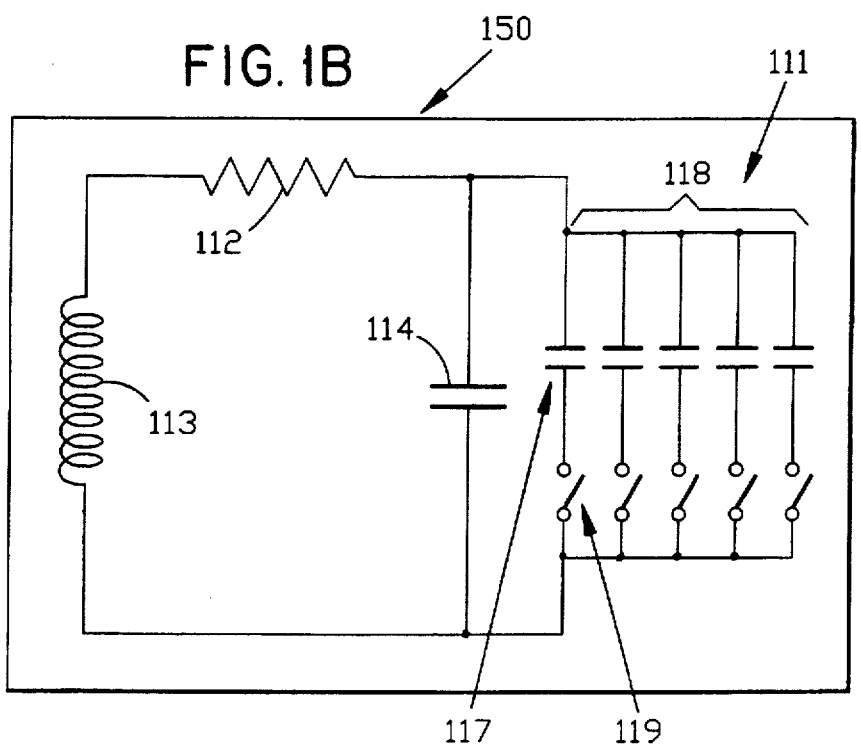
FIG. 1B is a diagram of a resonant circuit, remote from the base station and used as a transponder and/or tag, comprising several individual capacitors, e.g. circuit components, that can be connected by individual switches to the RLC circuit to change the overall resonant frequency.

A resonant circuit (in one preferred embodiment used as a tag/transponder) has the value of the total capacitance or inductance of the resonant circuit changed by connecting/disconnecting one or more individual circuit components from the (RLC) resonant circuit to change (shift) the resonance frequency of the resonant circuit. In a preferred embodiment, the connection/disconnection is made by a one or more magnetic switches. Each switch is "personalized," i.e. encoded, so that electrical contact (disconnect) is achieved at a particular value of an applied external magnetic field. At a given field intensity of the external magnetic field, the external magnetic field activates one (or more) of the magnetic switches to connect (or disconnect), i.e. add (delete), one or more of the circuit components, i.e., capacitors or inductors, to (from) the resonant circuit. This causes the resonant frequency of the resonant circuit to shift.

A base station sweeps an RF carrier signal through a range of frequencies at which the resonant circuit can possibly resonate. This range is determined by the combinations of circuit components that can be connected to and/or disconnected from the circuit. The frequency at which the RF carrier signal sweeps or passes through the range of frequency is called the sweep frequency. The base station determines the (shifted) resonance frequency of the resonance circuit by detecting a change in the absorption (reflection and transmission) of the RF carrier signal that results at the (shifted) resonant frequency.

Concurrently with the sweeping RF carrier signal, the base station varies (step wise or continuously ramps) an external magnetic field at a ramp rate (frequency) for the purpose of addressing different switches sequentially. Each switch makes (or breaks) electrical contact at a unique threshold magnetic field at the resonant circuit/tag location (local magnetic field). The local magnetic field is defined here to be the externally applied magnetic field at the tag whereas the total field at the tag is the combination of this local field and the tag bias field.

In one preferred embodiment, the ramp frequency is slower than the sweep frequency so that a complete sweep of the frequency range of the RF carrier signal is completed before two frequency shifts can be caused in the resonant circuit by the ramping external magnetic field. For example, once a first switch transfers (connects or disconnects) due to the local magnetic field passing through a first threshold magnetic field, the RF carrier signal will sweep through the entire frequency range before the external magnetic field increases (decreases) to a value to cause the local magnetic field to activate (connect or disconnect) the next switch.

More specifically, when a first local magnetic field intensity causes a first switch to make (break) contact, i.e., the local magnetic field intensity passes (increasing or decreasing) through a first threshold, a first circuit component(s) is added or deleted from the resonant circuit to cause the resonant circuit to resonate at a first known resonate frequency. Note that the first threshold magnetic field is unique because only the first switch(es) makes (or breaks) at this first threshold field thereby connecting (disconnecting) a first circuit component(s) of known value to (from) the resonant circuit which causes the resonant circuit resonant frequency to shift to resonate at a known first resonant frequency. Likewise, as the external magnetic field ramps and causes the local magnetic field to pass through a next threshold (field), a known next circuit component(s) is connected (disconnected) to cause the resonant frequency to shift again so that the resonant circuit resonates at a next known resonant frequency. Thus each given threshold magnetic field (local magnetic field intensity) is associated with a unique switch(es) and resonant frequency of the resonant circuit.

Therefore, when the sweeping RF field sweeps or passes through the first known resonant frequency while the circuit components are switched to cause the resonant circuit to resonate at the first known resonant frequency, a change in the signal received by the base station is detected at the first known frequency. This change indicates that the first switch made (or broke) contact. Also, if the base station detects that there is no shift to the first frequency when the first threshold of the local magnetic field is reached, it can be assumed that the first switch did not transfer (make or break contact). Therefore, the base station can establish a first code, e.g. a bit, indicating the presence (or absence) of the first known resonant frequency. In alternative embodiments, two or more switches are used to switch circuit components at other known next local magnetic field intensities. This allows the base station to detect other known next resonant frequencies, associated with the respective switches (added or deleted circuit components). By detecting each present (or absent) frequency (shift), the base station can establish a code of one or more bits, e.g. one bit for each frequency (shift) that is present or absent during the sweep(s) of the RF carrier.

A logic circuit and/or computer program is used to interpret the presence or absence of each of the resonance frequencies to establish a code (e.g. of one or more bits) that is used to transfer information from the resonant circuit (tag) to the base station.

The present system (190) shown in FIG. 1A includes one or more resonant circuits used as a transponder/tag (150) and a base station (175). In a preferred embodiment, the resonant circuit (150) has the fixed components of resistance (112), R, inductance (113) L, and capacitance C (114) and switchable components of inductance (116) $L_s$ and capacitance (117) $C_s$ which may be connected or disconnected by switches (typically 119) to the circuit (150) by way of an externally ramped magnetic field (103A). The system (190) includes a base station (175) provided for interrogating and detecting the resonant circuit (150) and the resonant frequency and shifts of resonant frequency of the resonant circuit (150).

The base station (175) comprises an emitter unit (109) and a detection unit (110).

The emitter unit (109) comprises an RF emitting carrier frequency antenna (104), an RF power supply (100), and a driver (101) for sweeping the carrier frequency (104A). The RF carrier/field (104A) sweeps (124) at a sweep frequency (124) through a range (134 in FIG. 1C) of frequencies called the swept frequency range or frequency range (134). The frequency range (134) includes one or more frequencies at which the resonant circuit (150) can potentially resonate, depending upon the circuit components that are connected/disconnected to the circuit (150) by the switches (119).

Concurrently, the varying magnetic field (103A) is transmitted by an additional antenna (103). A power supply (102) and a signal (e.g. ramp) generator (122) generate the varying (123) magnetic field (103A). The magnetic field (103A) is varied (123) at a varying or ramp frequency (123) to cause a local magnetic field (130) at the location of the resonant circuit (150).

The detection unit (110) detects a signal (155) returned from the tag (150). The detection unit (110) demodulates using demodulator (106) the returned signal (155) to detect a signal peak in the swept frequency range, impressed by the resonant circuit/tag (150). This signal peak occurs whenever the carrier field (104A) has the same frequency as the resonance of the RLC circuit. This resonance changes (shifts) as circuit elements are added or deleted from the RLC circuit.

When the base station (175) is able to cause the transponder (150) to resonate, receive a return signal (155), and cause the switches (119) to transfer (from on to off or from off to on), the transponder (150) is said to be in the field (120) of the base station (175). The transponder (150) can move into and out of the field (120), e.g. by way of a conveyor belt, cart, or person (not shown). Alternatively, the field (120) can move past the transponder (150) by moving the base station (175) in relation to the transponder (150).

The detection unit (110) comprises a computer (107) which functions to correlate a sensed resonance with the frequency of the returned signal (155) or a time delay of the ramped field (103A).

The peaks in the returned or detected signal (155) obtained as a result of sweeping (124) the carrier and ramping (123) the magnetic field in the presence of a tag can be used to establish a code (111). See below.

In general, the resonant frequency of an RLC circuit (150) is shifted by adding (deleting) capacitors in series or parallel. Similarly, the resonance is shifted when adding (deleting) inductors in series or parallel.

FIG. 1B shows an embodiment in which magnetic switches (119) are used to connect one or more capacitors (117) from an array (118) of capacitors to the resonant circuit (150). In this case, the array (118) is an array of parallel capacitors (117). As each capacitor (117) is connected, the resonant frequency of the circuit decreases in proportion to the reciprocal of the square root of the total capacitance in the circuit. Note that throughout this description, circuit elements, e.g. capacitors, will be described as being connected to (or deleted from) the resonant circuit (150) even though these circuit elements are always part of the resonant circuit (150).

Figure 1C:
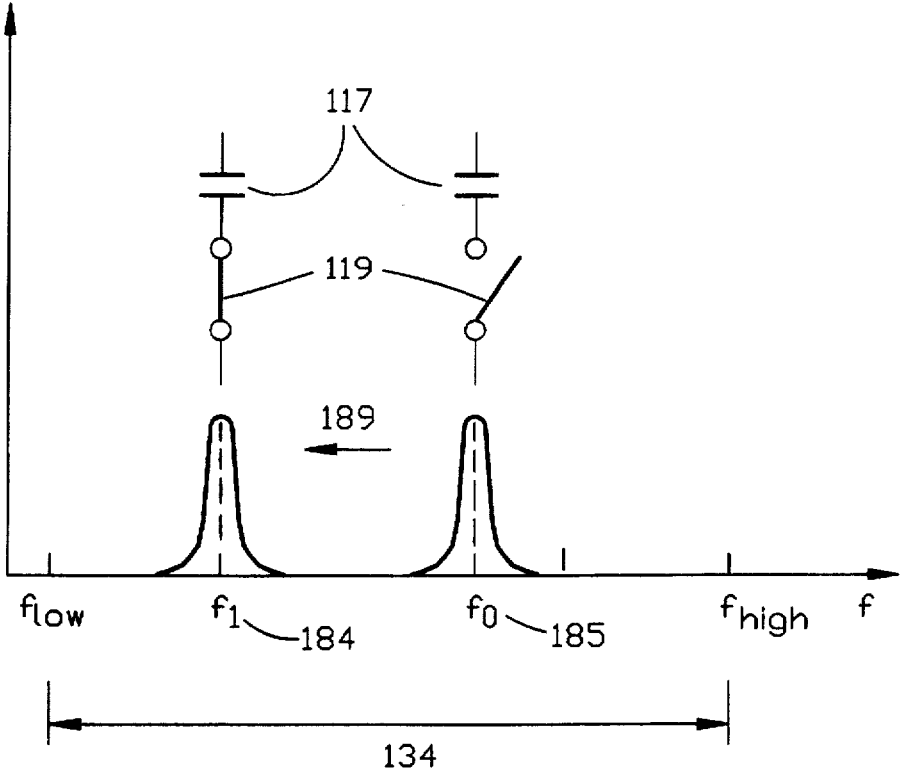
FIG. 1C is a diagram of the change (shift) in frequency with connection (or disconnection) of individual capacitors (circuit components) to the RLC circuit by way of the individual switches responding to varying magnetic field.

A frequency shift is shown schematically in FIG. 1C. The resonant frequency, $f_o$ (185) of the resonant circuit (150) is shifted (189) after the switch (119) adds the capacitor (circuit element 117) to the resonant circuit (150).

Figure 1D:
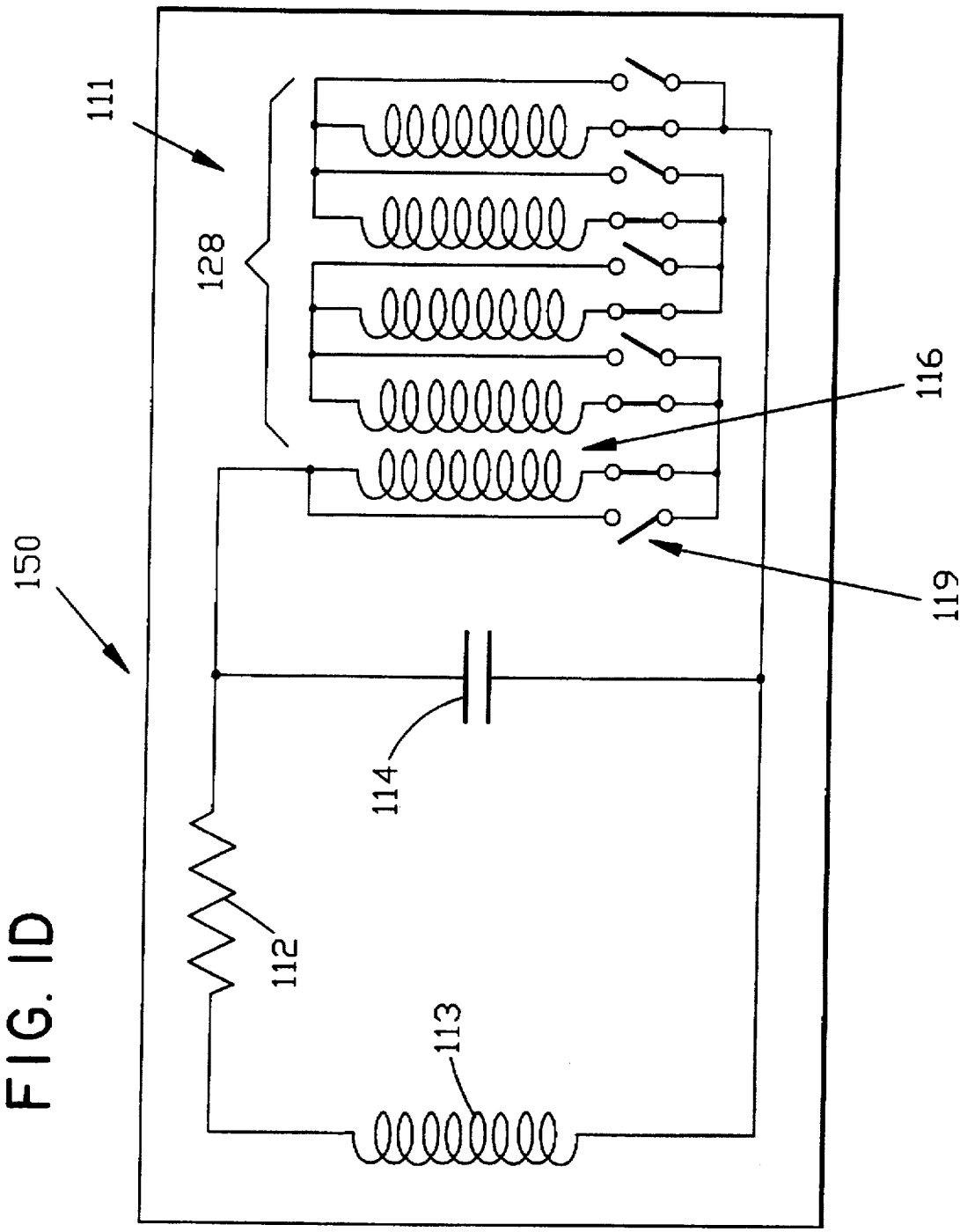
FIG. 1D shows the addition (deletion) of inductors in an array of inductors resulting in a change in the resonant frequency or the RLC circuit.

FIG. 1D shows the addition of an array (128) of inductors where each inductor (116) of the array can be connected to the RLC circuit (150) resulting in a change in the resonant frequency of the RLC circuit proportional to the reciprocal of the square root of the total inductance of the circuit. While the inductors can be added in series or in parallel with the RLC circuit, the embodiment shown in FIG. 1D exhibits an array (128) of parallel inductors connected in series with the fixed inductor (113).

There are several ways to establish a code using the present invention. In a preferred embodiment, the switchable array can consist of capacitors (117) connected in parallel by way of individual switches (119) as in FIG. 1B. In this embodiment each capacitor $C_i$ has equal capacitive value $C_1$. Each time a switch is closed as a result of the ramped magnetic field (103A), an additional capacitance, $C_1$, is connected to the RLC circuit and the resonant frequency (185) changes (189) accordingly to a next resonant frequency (184). Therefore, a set of resonant frequencies is established $f_n$ by consecutively switching n of the capacitors described above into the circuit (150). Each switch (119) is designed to close (and connect each respective capacitor $C_i$, 117) at a unique value, $H_i$ of the ramped field (103A) at the location of the transponder. Each of these local (130) values is called a threshold (136). A code is established by searching for the resonance at the respective frequency $f_n$ (184), corresponding to the connection of each $C_i$. The presence or absence of these resonances (184, 185) determine the code of 1's and 0's. In similar manner, the base station (175) can establish codes, i.e. a frequency set by switching the inductive (116) circuit components shown in FIG. 1D. A resonant circuit with both capacitive and inductive (150) switched circuit components can also be used.

Figure 1E:
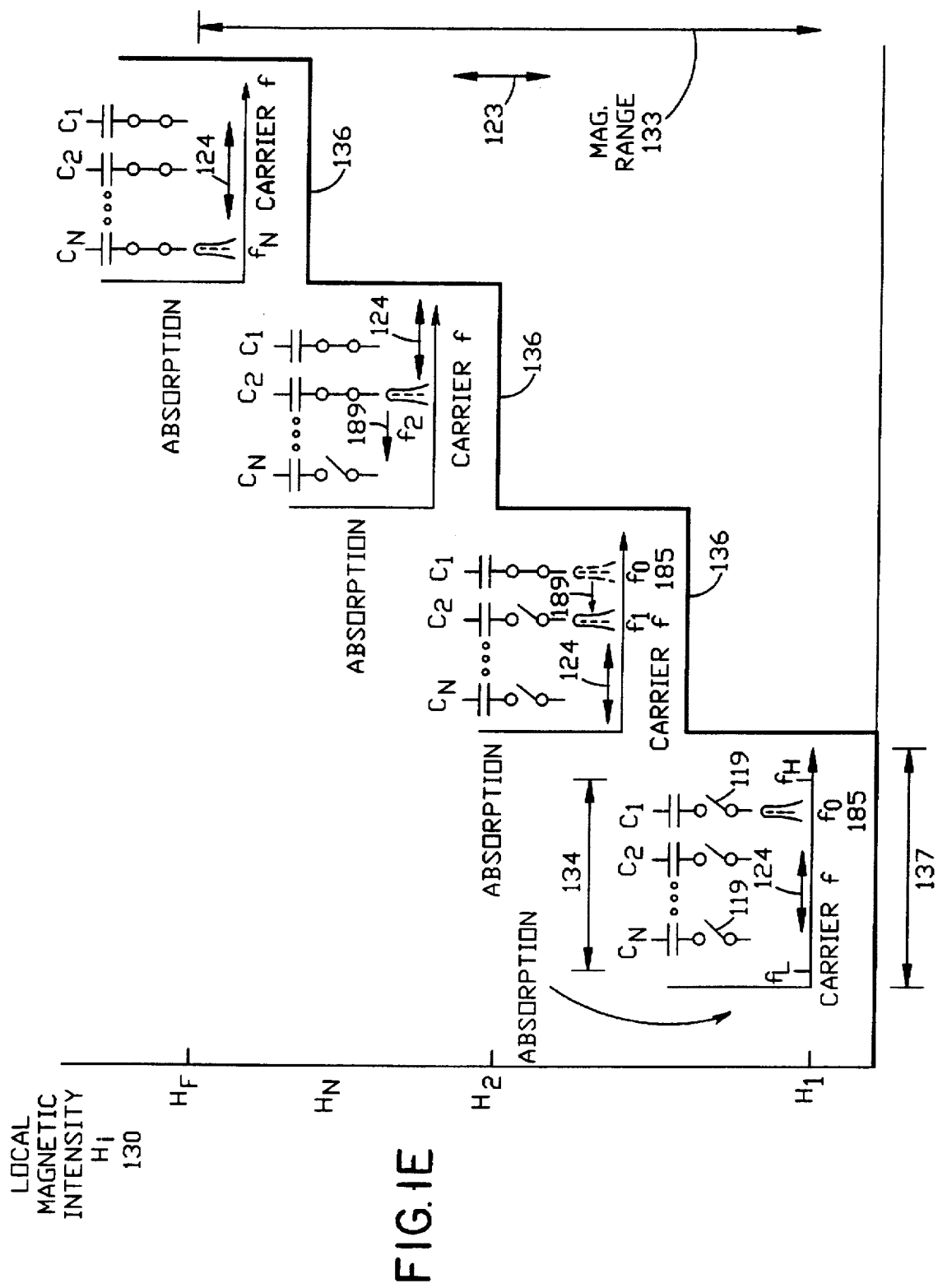
FIG. 1E is a drawing showing the relationship of a ramping magnetic field with the sweeping RF carrier to permit detection of switches connecting (disconnecting) known circuit components in the resonant (RLC) circuit to cause shifts in the RLC circuit resonance.

FIG. 1E is a drawing showing the relationship of a ramping magnetic field (103A) with the sweeping RF carrier (104A) to permit detection of switches connecting (disconnecting) known circuit components in the resonant (RLC) circuit to cause shifts in the RLC circuit resonance. The varying external magnetic field (103A) causes the local magnetic field (130) to vary with a ramp frequency (123). In FIG. 1E, the local magnetic field (130) varies in a step wise increasing manner with each step being equal to or above a threshold value (136) of the local magnetic field intensity (130.) One or more of the threshold values (136) causes a switch(es) (119) in the resonant circuit (150) to transfer.

The RF carrier (104A) sweeps at sweep frequency (124). The RF carrier sweeps the whole frequency range (134) in one period (137) of the sweep frequency. The local magnetic field does not pass through the a next threshold (136) value of field intensity until the RF carrier has swept through the whole frequency range (134) at least once.

Note that in FIG. 1E the local magnetic field (130) is shown as step wise increasing. However, the local magnetic field (130) can also ramp as a linear or other increasing function. In cases where the field (130) is ramping (123) as an increasing function, the field (130) "passes through" a threshold (136) by having an intensity greater than or equal to the threshold (136). The field (130) can also ramp as a step wise or linear (or other) decreasing function. When the field is ramping (123) as a decreasing function (not shown), the field (130) passes through a threshold (136) by having an intensity less than the threshold (136). In embodiments similar to those of FIG. 1E, where there is more than one bit (switching circuit component) on the resonant circuit (150), the local magnetic field (130) does not pass through a threshold (136) intensity until the RF carrier sweeps through at least one period (137), i.e., one entire frequency range (134).

Note that FIG. 1E shows only positive values of the ramped field (130) for simplicity. However, in order to account for any possible alignment of the transponder (150) with respect to the local magnetic field (130), the local magnetic field (130) must also go through the entire range (133) with a negative amplitude. In this negative region, the RF carrier again sweeps through at least one complete period (137) before the local magnetic field (130) passes through the next threshold (136). See also FIG. 1F description.

The base station (175) interrogates the resonant circuit (150) by sweeping (124) the carrier field (104A) to search for one or more values of $f_n$, within a predetermined frequency range (134). In a preferred embodiment, the varying magnetic field (103A) is varying at a ramp or varying frequency (123), slower than the sweeping of the RF (124) frequency so that within one period of the sweeping (124) of the RF carrier (104A) the varying magnetic field (103A) may only pass through one value of $H_n$ (130), i.e., one of the local threshold values (136) of magnetic field. If during the sweep cycle (124) of the RF carrier (104A) a switch has made (broken) contact due to the local magnetic field (130), $H_n$, passing through (e.g. in a preferred embodiment equaling or exceeding) a threshold (136), the base station (175) detection unit (110) will detect the resonance of the tag (150) at $f_n$, and this bit in the computer (107) memory is assigned a value, typically a '1'. If that resonance is not detected at the given value of $H_n$, the bit is assigned another value, typically '0'.

In similar manner, two or more switches are configured to connect or disconnect at different threshold intensities (136) of magnetic field (130), $H_i$. As the magnetic field continues to vary (ramp or step), a second (next) switch(es) will dose (open) to connect (disconnect) a second (next) circuit component (116, 117) when the magnetic field (103A) passes through a second (next) local intensity (130). As before, the magnetic field (103A) is varying at a ramp (123) slower than the sweeping of the RF (124) frequency so that within one period (137) of the sweeping (124) of the RF carrier (104A), i.e. through the entire range (134), the varying magnetic field (103A) causes the local field (130) to pass through only one value of $H_n$, i.e. the (next) second local field intensity (130). The base station (175) then detects the resonance of the resonant circuit (150) at a second (next) resonant frequency (189) that is determined by the first and second (next) circuit component (116, 117) being connected to the resonant circuit (150). This frequency (bit) is then assigned a value, e.g. 1, indicating that the resonant circuit (150) was resonant at this frequency (185, 189), i.e., the second (next) switch (119) added (deleted) the second (next) circuit component to the resonant circuit (150). The process continues as the magnetic field (103A) varies (e.g. increases) until a local magnetic field intensity (130) ramps (123) through the entire magnetic field range (133). At this point every switch (119) on the resonant circuit (150) is closed (opened) and the base station (175) detects the final respective resonant frequency (185).

Figure 1F:
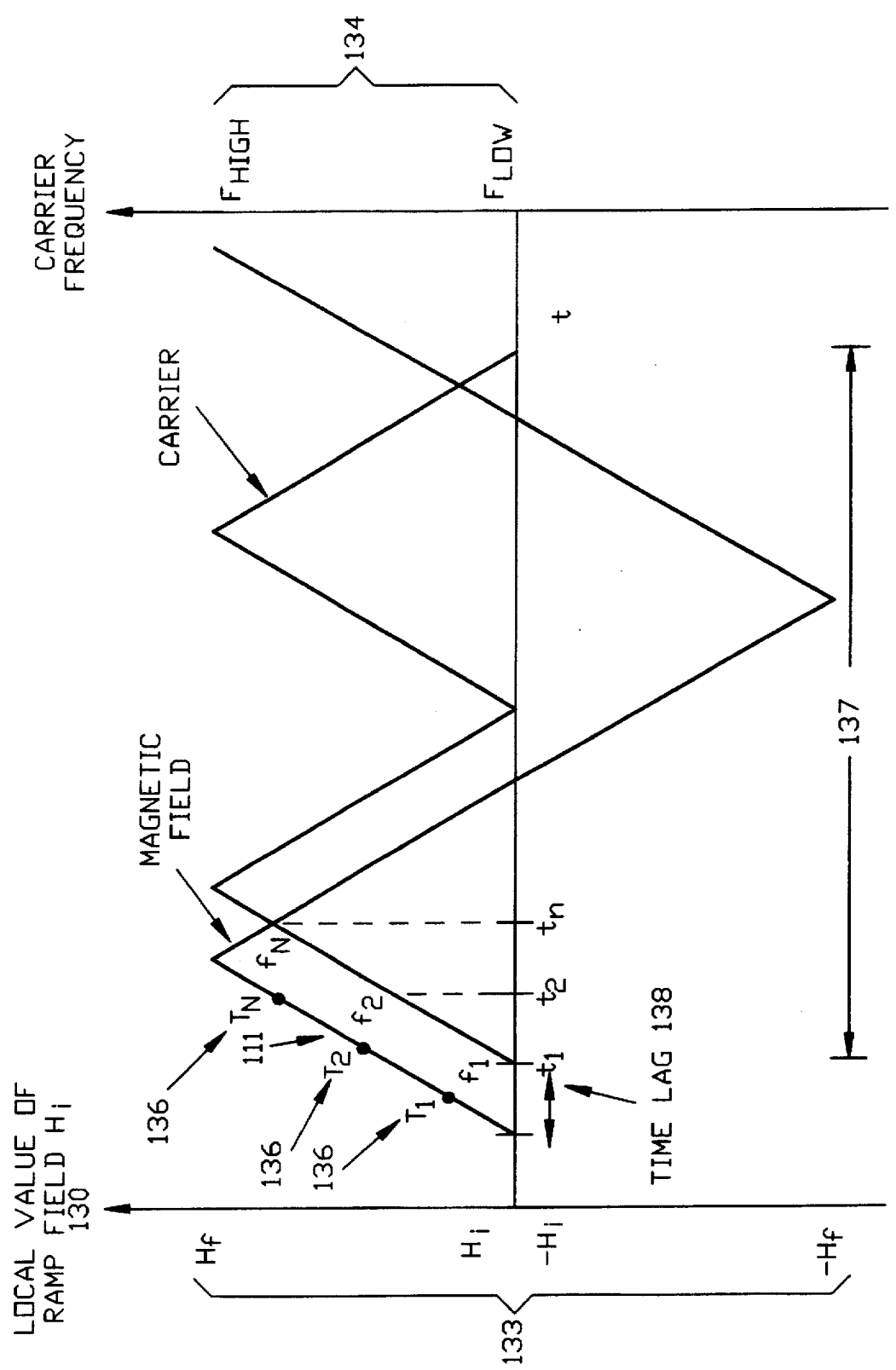
FIG. 1F shows an alternative preferred embodiment of the ramping magnetic field with the sweeping RF carrier to permit detection of switches connecting (disconnecting) known circuit components in the resonant (RLC) circuit.

FIG. 1F shows an alternative preferred embodiment of the ramping magnetic field (103A) with the sweeping RF carrier (104A) to permit detection of switches connecting (disconnecting) known circuit components in the resonant (RLC) circuit to cause shifts in the RLC circuit resonance. In this embodiment, the carrier frequency sweep (124) begins after the magnetic field ramp (123) by a time lag (138). Here, the RF sweep rate is twice that of the magnetic ramp field sweep rate. The relationship between the two sweep rates comes about because the ramp field must have both positive and negative excursions in order to take into account the arbitrary orientation of the tag with respect to the externally applied magnetic field. By sweeping the RF field at twice the rate as that of the magnetic ramp field, the RF frequencies are sampled in an equivalent manner for both positive and negative excursions of the magnetic ramp field (See FIG. 1F). In this embodiment, the carrier sweep does not begin again until the local magnetic field (130) has ramped through the one half cycle of its entire magnetic range (133). In other words, the carrier frequency sweeps through the frequency range (134), twice for each full ramp cycle (133) of the external magnetic field (103A). The magnetic ramp and the frequency sweep change in such a way that each threshold (136), $T_n$, is reached before the carrier frequency sweep reaches the resonance frequency, $f_n$, associated with the respective threshold. However, the next threshold, $T_{n+1}$, is not reached by the ramp before the carrier frequency sweep reaches $f_n$. For example, the carrier frequency sweep reaches resonant frequency $f_1$ at time $T_1$ after the local magnetic field (130) passed through the threshold (136) $T_1$ that transferred the switch (119) that caused the transponder (150) to have a resonant frequency of $f_1$. However, the ramp does not pass through the threshold (136), $T_2$, until after the carrier sweeps through $f_1$. As before, the sweeping and ramping can be increasing, decreasing, linear, step wise, or other functions.

As the magnetic field varies (123) over a range of intensities (magnetic field intensities), the base station (175) will detect the transfer (opening or closing) of each switch (119) in the resonant circuit (150) as the local magnetic field intensity (130) passes through the threshold value (136) needed to make a given switch (119) transfer and the RF carrier sweeps past the next resonance frequency (184) resulting from the connection (disconnection) of the next circuit component (116, 117) associated with the last transferred switch (119). Further, the computer will record a value, e.g. 1, for each resonant frequency (184, 185) in the frequency set (111), or shift (189) that is detected. For example, all frequencies in the frequency set will have the value of '1's' since all $f_n$'s known to be possible for the resonant circuit (150) are found after an appropriate number of frequency sweep cycles. If, on the other hand, a switch (119) on the resonant circuit (150) corresponding to a particular value of $H_i$ (130) is not present, another value, e.g. zero, will be associated with the absent frequency. Therefore, by ramping the magnetic field (103A) through the magnetic field range and sweeping (124) the carrier frequency (104A) through the frequency range (134) each time a switch (119) transfers, i.e., the local field (130) passes through a threshold (136), the base station (175) computer (107) will detect a (binary) pattern or code of 1's and 0's indicating the presence or absence of a resonance frequency (185) in the resonant circuit (150) due to the connection (disconnection) of a circuit component (116, 117) by the transferring switch (119).

In the scheme shown in FIGS. 1F, the switches with the lowest and highest local magnetic thresholds serve as reference bits to mark the beginning and end of a sweep (124) and/or ramp (123), i.e. a "query sequence" so that the interrogation is complete. These bits should always be a given value, e.g. '1', to ensure that each switch has been addressed. For greater accuracy, the computer may repeat the query sequence, i.e. the ramp.

For example, let the circuit components comprise an array (118) of capacitors (117). In general, the possible resonant frequencies are inversely proportional to the square root of the total capacitance in the circuit. All capacitors are chosen to have the same value of capacitance so that each reached threshold (136) adds (deletes) the same value of capacitance in parallel. The code is established by selecting the number of switches that switch (119) at a particular value of magnetic ramp field. For example, a code that contains all 1's will consist of each switch activated so that each capacitor in the array is connected at a different setting. $H_i$, (130) of the ramp field. In this case the RLC circuit will resonate sequentially at all possible frequencies $f_i$ where $f_i$ is equal to a function of the total capacitance. The total capacitance will be $C_0+i\times C_1$.

To provide a '0' in a particular bit associated with $f_i$, and a '1' at the bit associated with $f_{i+1}$, the magnetic switches are set so that no switch is activated at $H_i$ but two switches are activated at $H_{i+1}$. This is required to add (delete) the capacitance needed (2 $C_1$) to produce the total capacitance ($C_0$+ (i+1)$\times C_1$) required to make the transponder resonate at the frequency $f_{i+1}$. In this example we assume a resonance at the frequency, $f_{i-1}$. Therefore the RLC circuit resonates at $f_{i-1}$ and at $f_{i+1}$ but not at $f_i$ and the bits associated with these frequencies will take the value '1' '0' '1' respectively.

The restriction on the values of the capacitors, that is to make each capacitor equal is one of convenience. A variety of capacitor values can be selected and still yield the intended result. Likewise, a similar interrogation can consist of an array (128) of inductors (116) connected in series as in FIG. 1A. Here, the switches (119) are used to connect/disconnect each inductor independently where a connection consists in shorting the inductor from the circuit.

Another embodiment makes use of a resonant dip as a function of time with respect to the first dip to establish a code. The presence or absence of resonant dips with respect to the first dip is used to establish the code. For a known temporal variation of the magnetic ramp field, preferably linear, and knowing the threshold magnetic field value needed to activate each switch, the temporal delay between successive resonant dips is measured and the presence or absence of these dips at pre-established delay time is used to create a code. A combination of capacitive and inductive elements can also be used to establish a code. The relationship between the RF and magnetic ramp field sweep rates can be those shown in FIGS. 1E or 1F. The scheme utilizing the fast RF sweep rate in FIG. 1E is preferred. The scheme in which the RF sweep and magnetic ramp are synchronized as in FIG. 1F, requires that the action of the switches as a function of time within each quarter of the sweep cycle (137) causes the frequency shift to be in the same direction, that is increasing or decreasing.

Switches (119) for adding (removing or deleting)circuit components to the RLC circuit (150) can be made in several ways by utilizing different properties of magnetic materials comprising the switching elements (119).

Figure 2A:
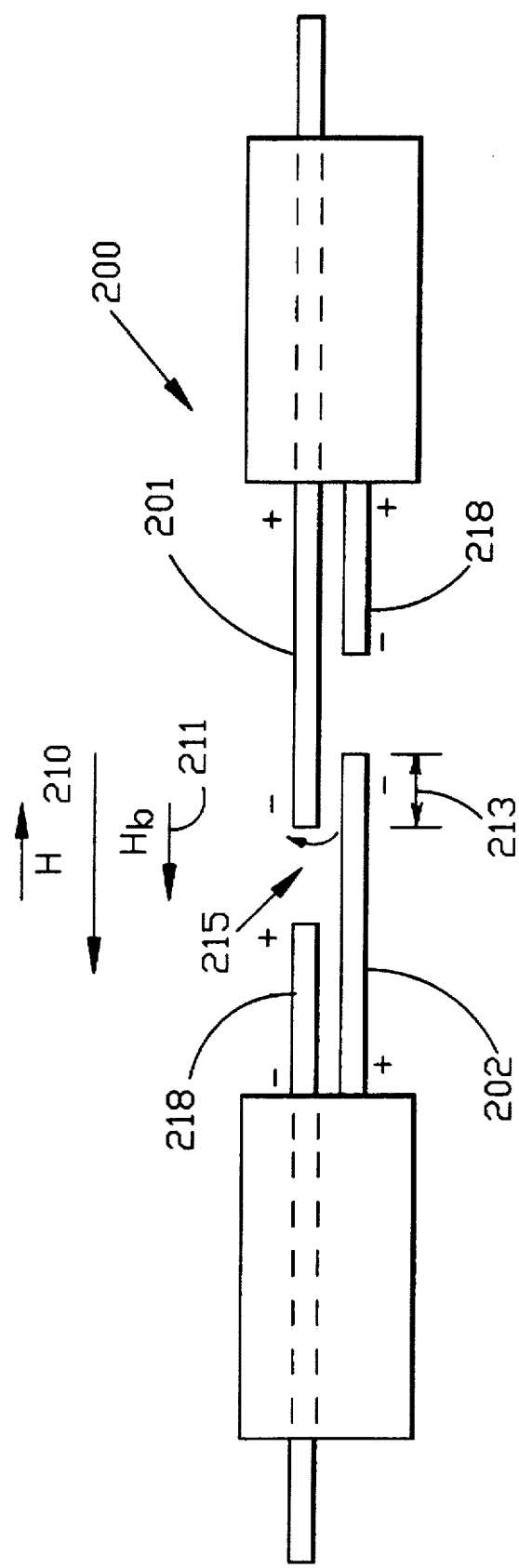
FIG. 2A shows a reed switch (magnetic switch) with two magnetic elements separated by a small gap.

Shown in FIG. 2A is a switch (119) commonly referred to as a reed switch (200) consisting of two soft magnetic, low remanent elements (201,202) separated by a gap (215) preventing electrical contact between their overlapping regions (213). Upon the application of a magnetic field (210) of a given intensity, the overlapping (213) ends of the elements (201,202) become magnetized with opposite polarity causing an attraction between the two elements (201, 202). When the magnetic force overcomes the stiffness of the two elements (201,202), electrical contact between the elements (201,202) is established.

Several ways can be used to make each switch (119) close at a different value $H_i$ (130) of the applied external magnetic field (103A). For example, the reed switches (200) can have elements (201,202) comprising different lengths, thicknesses, density, Young's modulus, permeability, region of overlap gap (213) spacing (215) or a combination of these parameters. In addition an array (118, 128) of identical switches can be activated with the external magnetic field (103A) at varying values (130) of the external magnetic field (103A) by using additional individual bias magnetic fields. The bias magnetic fields (211) comprise, for example, different strengths of hard magnets (218) positioned in the immediate proximity of each switch (200) and/or switch element (201,202). In the present application, the reed switches need not be in vacuum or even necessarily be encapsulated since the potential difference between the two elements is always small as is the current carried by the switch.

Figure 2B:
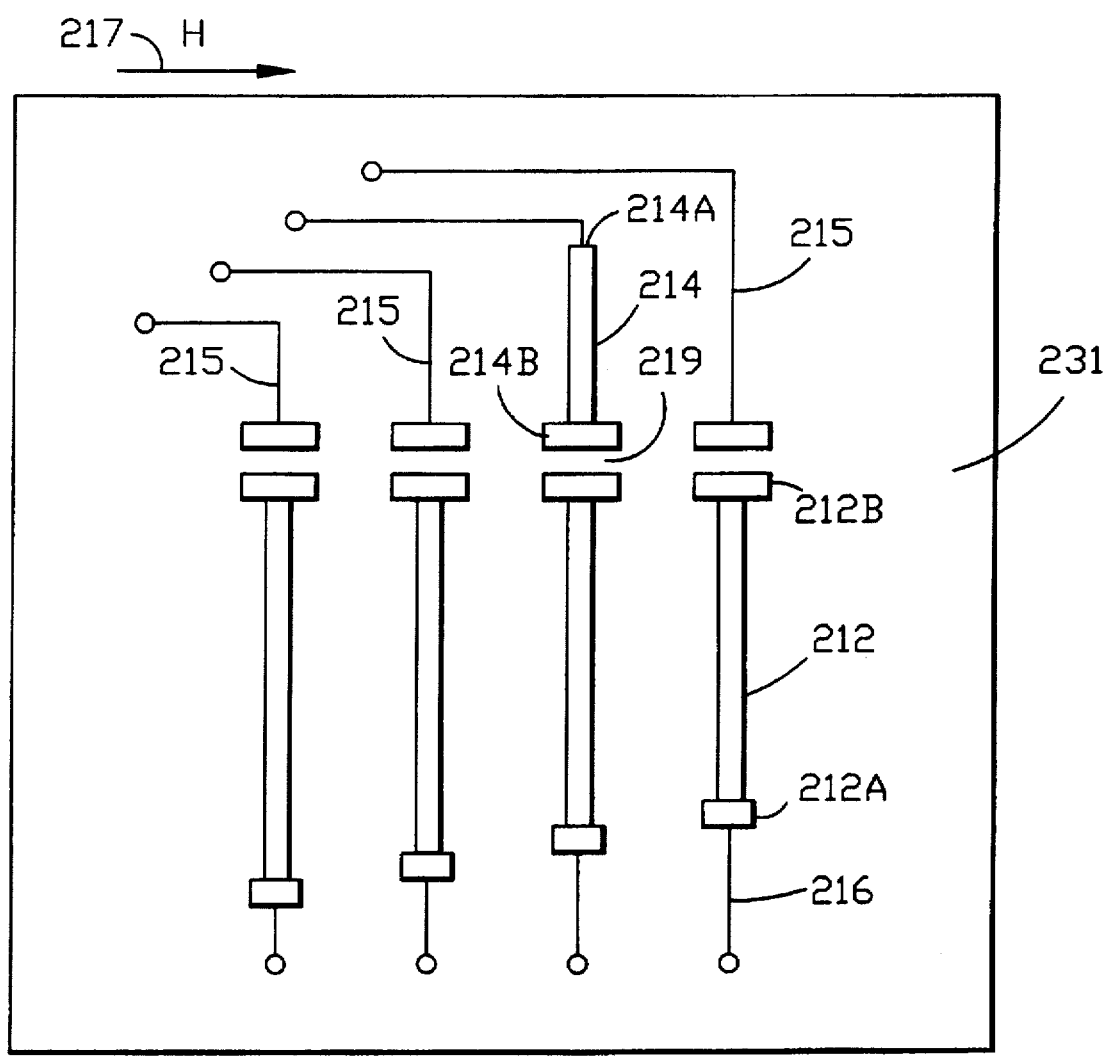
FIG. 2B shows magnetic switches using two magnetostrictive elements of varying length where a first magnetostrictive element has a fixed and a free end and the free end is free to make or break contact with an opposing metallic element.

FIG. 2B shows switches utilizing magnetostrictive elements (typically 212, 214) of varying length. Here, one end (212A) of the element (212) is firmly attached to the substrate (231) while the free end (212B) of the element (212) can move to make contact with a second magnetostrictive element (214). The second magnetostrictive element (214) has a fixed end (214A) and a free end (214B). The free ends (212B and 214B) are opposed to one another to form a gap (219) that varies in size depending on the varying magnetic field (103A). The free ends (212B and 214B) make electrical contact with one another when the local magnetic field (130) caused by the varying magnetic field (103A) exceeds a threshold (136) value.

Alternatively, a single magnetostrictive element, like (212), can be used to make contact with a fixed electrode (215). The fixed element (215) is attached to the substrate (231) so that it can not move with respect to the movable magnetostrictive element (212) when the varying external magnetic field (103A) is applied.

Both positive and negative magnetostrictive elements can be used. For the case of positive magnetostriction, a given circuit element (116, 117) is disconnected from the RLC circuit (150) in the absence of the ramp field (103A). For negative magnetostriction, the element (116, 117) is connected in the absence of the ramp field (103A) and becomes disconnected in the presence of the field (130) of the appropriate intensity.

Figure 2C:
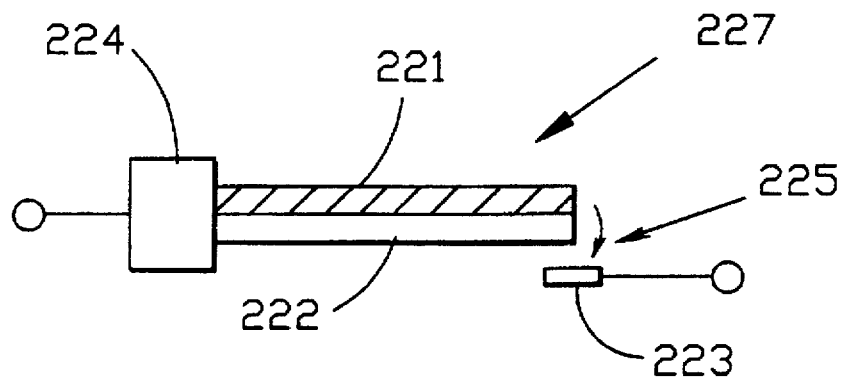
FIG. 2C shows a switch in the form of a bimorph consisting of at least one magnetic member with a clamped and a free end and where the free end is able to bend onto an opposing member to make or break electrical continuity.

Yet another embodiment is shown in FIG. 2C in the form of a bimorph (227), the bimorph consisting of at least one magnetostrictive material (221) laminated to a second material (222). One end of the bimorph is clamped or rigidly attached to a support (224) while the free end is free to bend (225) in such a way as to make electrical contact with a fixed contact (223).

Figure 2D:
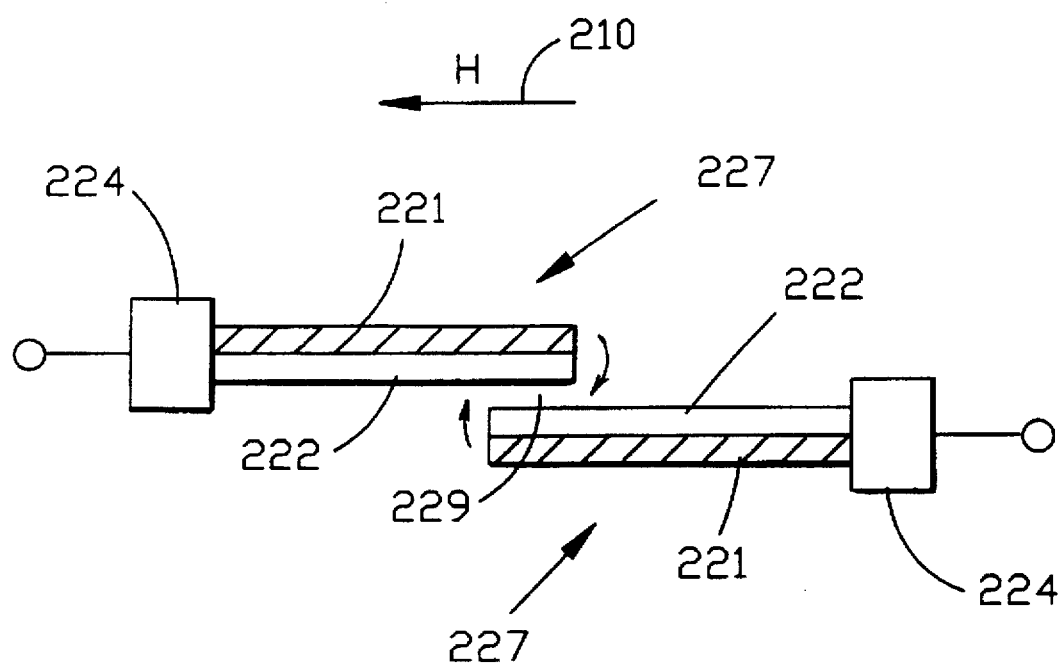
FIG. 2D shows a switch using two bimorphs of opposite radius of curvature disposed to make or break contact with a circuit element upon application of a magnetic field.

FIG. 2D is an extension of the concept described in FIG. 2C. Here two bimorphs (227) are used, positioned in such a way that upon application of an externally applied magnetic field (210) they bend toward one another to close a gap (229) and establish electrical contact. The direction of the bending depends both on the sign of the magnetostrictive coefficient and on the relative position of the magnetostrictive layer of the bimorph element with respect to the second element. Therefore switches can also be constructed which open with increasing magnetic field.

Figure 2E:
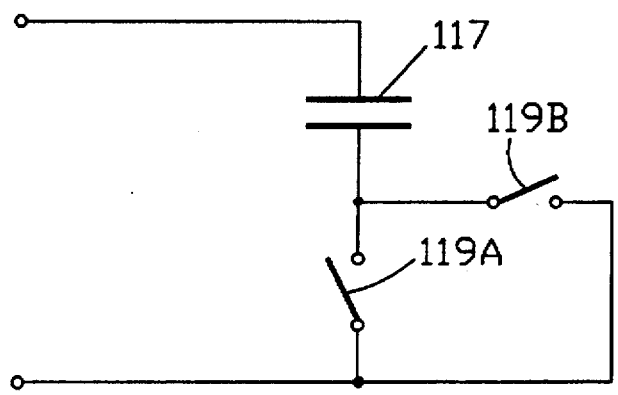
FIG. 2E is a drawing of a capacitor component with two switches, each able to connect or disconnect the capacitor but with each of the two switches disposed at right angles to maximize the efficiency of the applied magnetic field.

In all of the descriptions for switches as outlined in FIGS. 2A-D, two switches can be used for each element, each element of each pair of switches disposed at an angle with respect to one another to minimize their dependence on the orientation of the magnetic field. This embodiment is shown schematically in FIG. 2E where the switches (119A) and (119B) are physically disposed at an angle to one another, i.e., non parallel. The capacitor (117) will be switched when the magnetic field is more closely aligned with the axis of one switch (119A) compared to the axis of the other (119B). Magnetostrictive devices with elements aligned on more than one axis are disclosed in U.S. patent application Ser. No. 08/569,375, entitled "Modulation of the Resonant Frequency of a Circuit Using an Energy Field", to Schrott et al. filed on Dec. 8, 1995, which claims priority to U.S. patent application Ser. No.. 08/514,705 that is now abandoned, and which is herein incorporated by reference in its entirety.

Figure 2F:
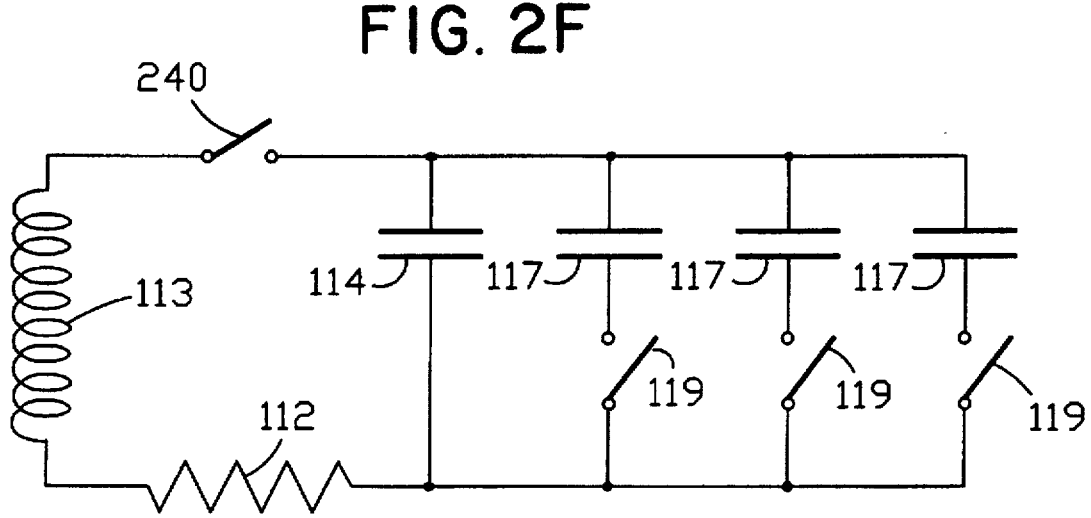
FIG. 2F shows a master switch which is used to short all of a set of circuit components thereby effectively deactivating the tag (and/or an array of circuit components on the tag) non-destructively.

FIG. 2F is a schematic for a master switch (240) which can remain in an open or closed position with or without magnetic fields below certain thresholds (136) of the externally applied magnetic field intensity (103A). The purpose of the switch is to render a sufficient number of inductive and capacitive elements ineffective so that the resulting resonant frequency of the circuit falls beyond a specified operating frequency range. In this manner, some or all of the circuit or tag (150) can be deactivated non-destructively.

Figure 3A:
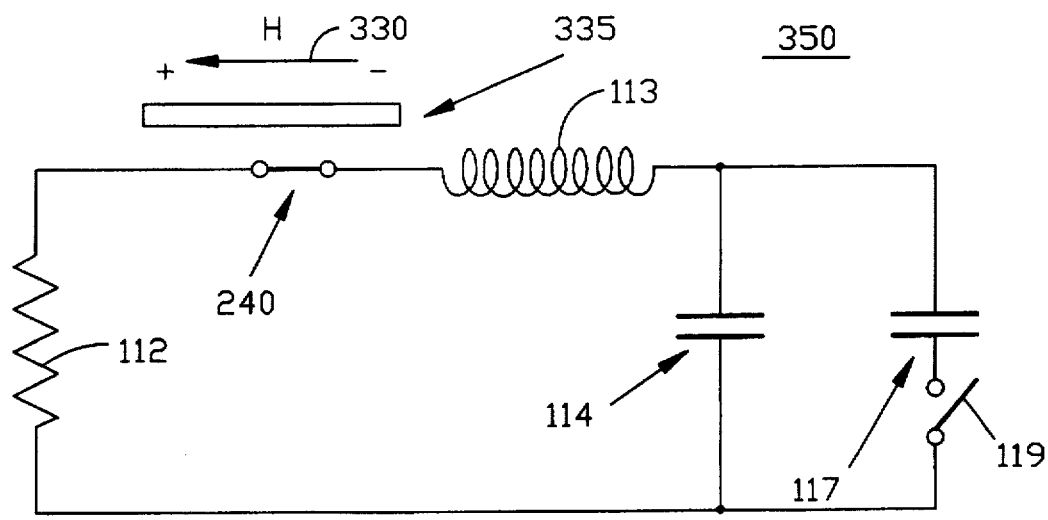
FIG. 3A is a diagram which shows a master switch, connected in series with the fixed capacitor of the RLC circuit, responding to the application of an external dc magnetic field.

One preferred apparatus (350) shown in FIG. 3A is used both to enable and disable a tag (150). This embodiment (350) includes a magnetic master switch (see FIG. 2F) in series with the fixed inductor (113) of the RLC circuit and in series with the variable capacitor array (118). This master switch (240) is initially in an open position so that no resonance occurs within the frequency range of the RF field (104A) sweep. Application of an external DC magnetic field (330) of sufficient intensity closes the switch (240). The switch (240) has at least one element of high coercivity (335). This coercivity value is higher than any of those used in the switches (119) controlling the capacitive/inductive elements (117, 116). When the DC magnetic field (330) is presented, the switch (240) closes and the RLC circuit is active. The switch is designed so that the high coercivity in conjunction with high permeability also provides sufficient bias for the master switch to keep it open or closed during normal operation, i.e. during the interrogation of the tag. The master switch has a coercivity higher than any of the switches within the capacitive/inductive array. Thus, all the individual switches (119) are now in their appropriate magnetized biased state given by their remanent field so that they switch at their designed or preset threshold (136) value of the external varying magnetic ramp field (103A, 130) corresponding to each respective switch. Because the amplitude of the ramp field (103A) is always less than any of the coercive fields of any of the tag switches (240, 119), the array switches will always be activated either by the positive or negative excursions of the ramp magnetic field.

Figure 3B:
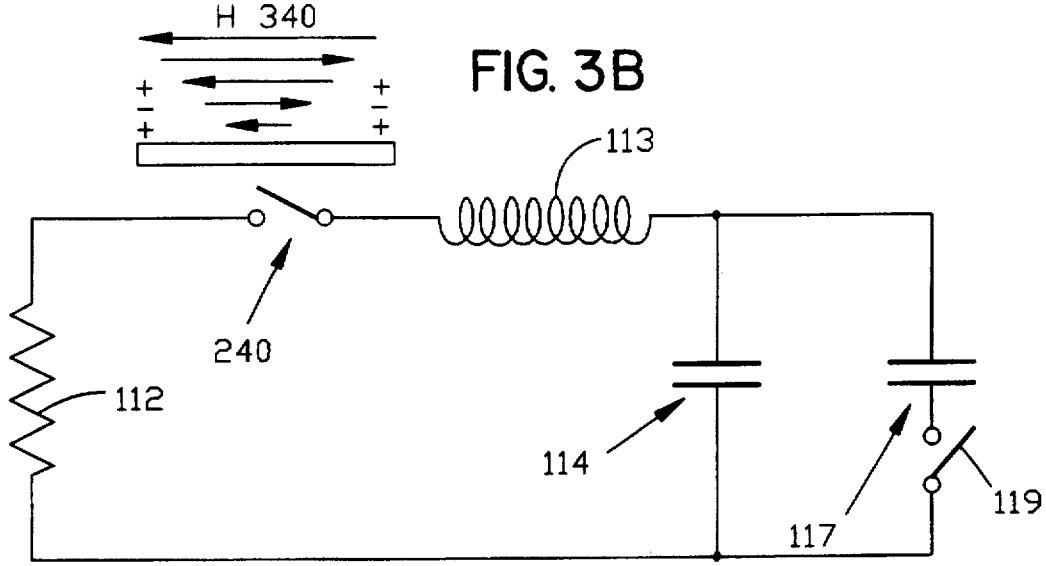
FIG. 3B is a diagram which shows a master switch being disabled using an externally applied decrementing ac magnetic field.

FIG. 3B illustrates a disabled tag using the master switch (240). The disabling requires the master switch to be demagnetized by applying a decrementing ac magnetic field (340) that demagnetizes the master switch (240), causing the master switch (240) to open.

Figure 3C:
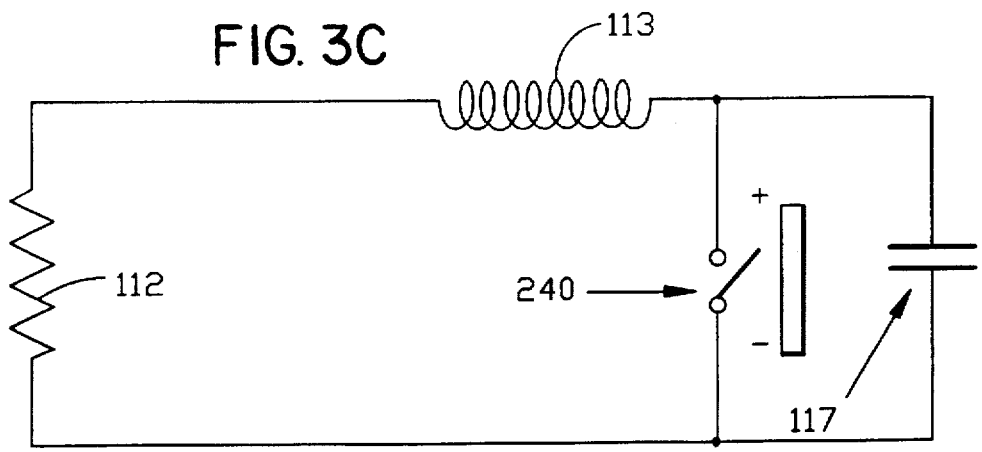
FIG. 3C shows a master switch connected in parallel with a capacitor array so that the tag is active when the switch is open.

An additional way to disable/enable the tag/transponder is to use the magnetic master switch placed in parallel with the capacitive/inductive array as shown in FIG. 3C. Here the tag is active when the switch is open, inactive when closed. To achieve this the switch is magnetically biased in the open position, demagnetized in the closed position.

Figure 3D:
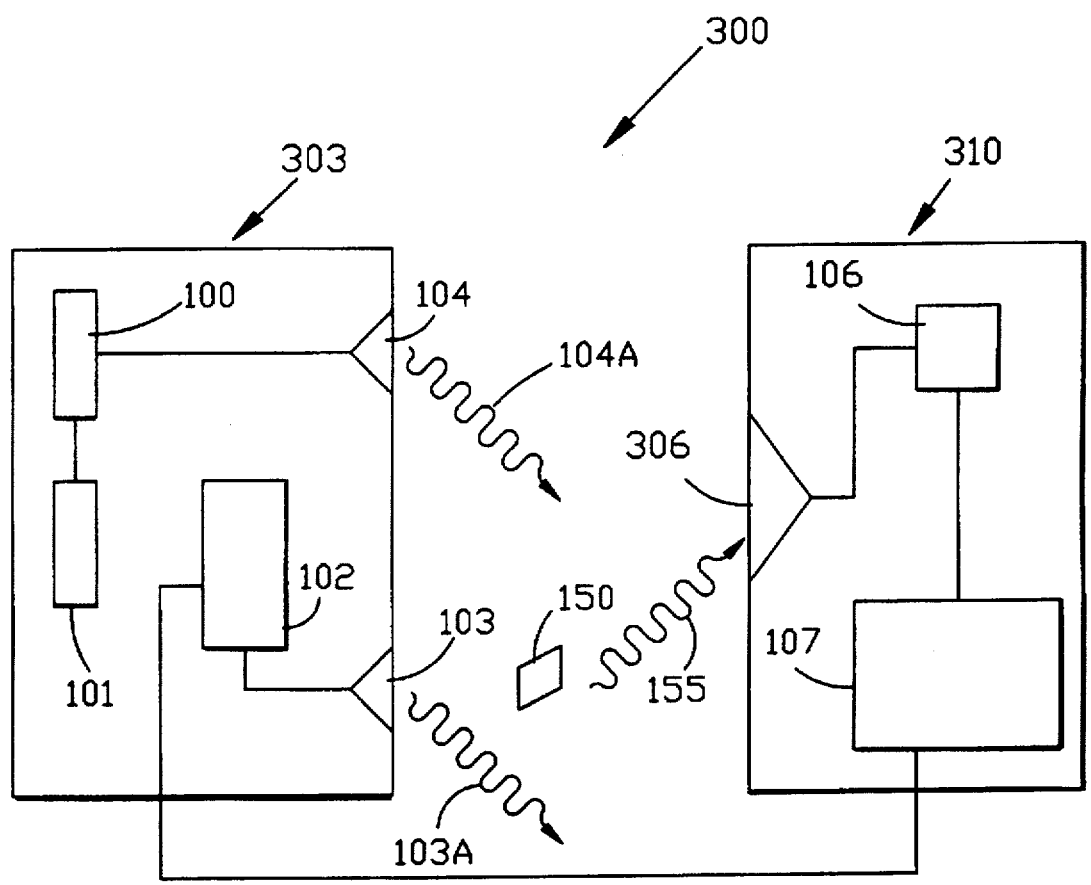
FIG. 3D is a block diagram of an interrogation-receiving system used with the transponders/tags with the switchable circuit components.

FIG. 3D is a schematic of the interrogation (109,303) and receiving (110,310) units. The interrogator (303) contains an RF generator (100) which emits a continuous or quasi-continuous RF signal (104A), typically in the MHz frequency range. In addition, a second generator (101) is used to sweep the RF frequency about a center frequency at a relatively lower frequency, typically, though not limited to 100 Hz. A third generator (102) is used to provide a varying magnetic field (103A). The interrogating signals (104A, 103A) are propagated by suitable antennas (104, 103) such as single loops of wire to excite the RF tag/transponder (150) with both the RF (104A) and magnetic ramp signals (103A).

The varying external magnetic field (103A) functions to switch into or out of the RLC circuit additional inductive (116) or capacitive (117) elements, thereby changing the resonant frequency of the tag/transponder (150). Typically, this field consists of a triangular wave with equal positive and negative excursions to compensate for the arbitrary orientation of the tag's internal bias field. Alternatively, the varying magnetic field can increase or decrease in a stepwise manner as shown in FIG. 1E. The RF field (104) sweeping rate (124) is correlated with the rate of the external varying magnetic field (103A) sweep rate (123) in order to apply the different schemes already outlined.

The computer (107) is programmed to recognize a resonance by comparing the received signal (155), from antenna (105,306) with the pre-established frequency background amplitude level. According to the selected scheme or protocol, the computer can search for resonances at a given set of frequencies or at a given set of delay times with respect to the first detected resonance which determines the initiation time as already explained.

Figure 4:
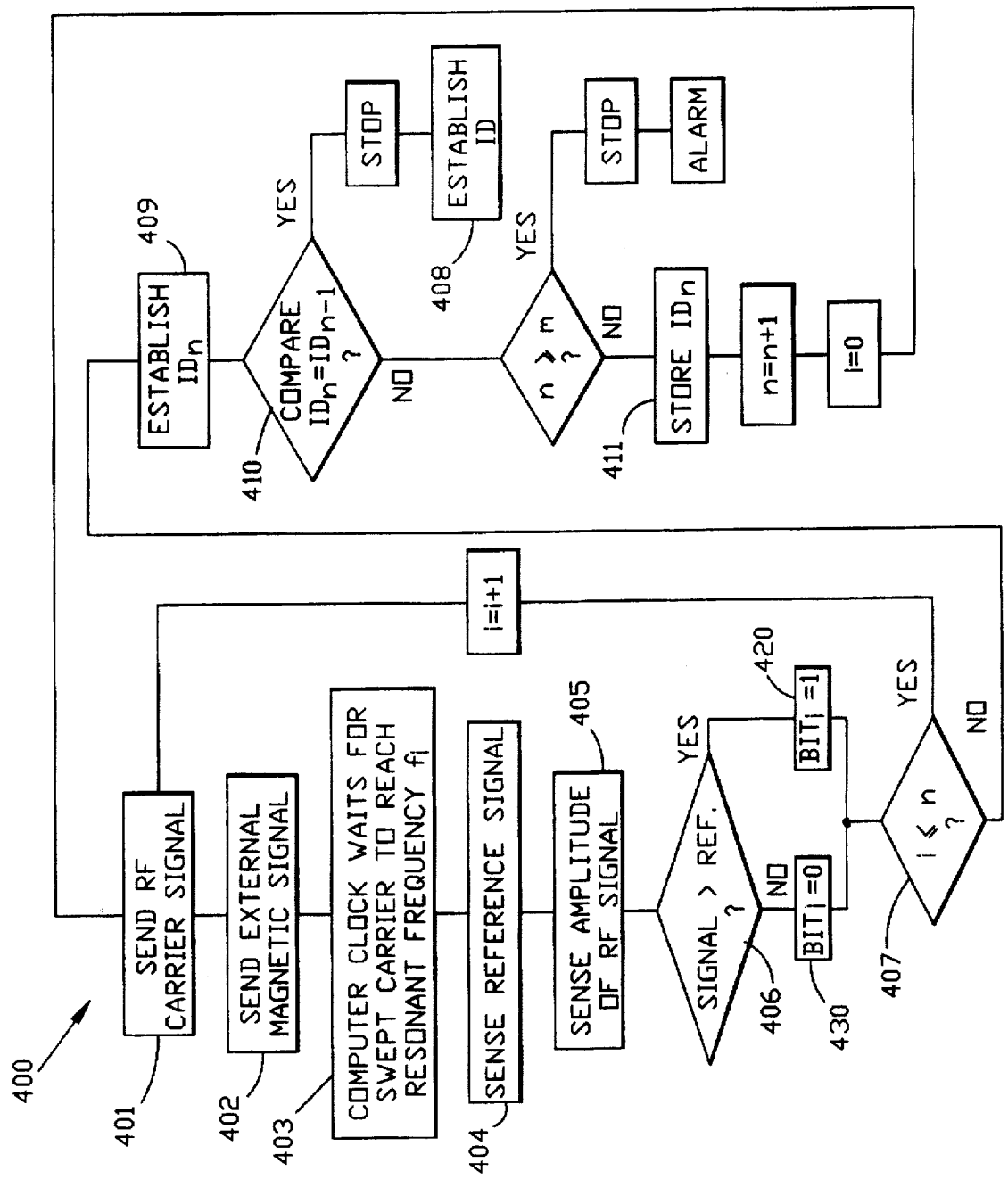
FIG. 4 is a flow chart of a preferred method with steps for sending an interrogation signal and analyzing the detected signal from the transponder/tag.

FIG. 4 is a flow chart showing the steps performed by the base station (175) of the tag/transponder, interrogation and detection system (190). The method 400 comprises the following steps: sending both the swept RF carrier signal (401) and the varying external magnetic signal (402), either simultaneously or with a temporal phase shift, from separate antennas. The pickup antenna senses (404) the amplitude of the RF signal modified by the tag circuit elements away from resonance which constitutes a background reference signal. The computer clock waits for the swept carrier to reach the resonant frequency, $f_i$ (403). The pickup antenna senses (405) the amplitude of the RF signal modified by the tag's circuit elements at resonance, $f_i$. The detected RF amplitudes at preselected frequencies $f_i$ are compared (406) by the computer with the pre-established reference signal. The presence or absence of a dip in the RF amplitude corresponds to a '1' (420) or '0' (430) respectively at a particular frequency which constitutes a logic bit. The interrogation process continues (407) until all of the possible pre-established frequencies have been addressed thereby establishing the identity (408) of the tag.

For additional accuracy, this process can be repeated an arbitrary number of times consistent with practical needs for rapid polling of tags. The repetition of the RF sweep cycles and the magnetic ramp field cycles make it possible to obtain a better statistic which leads to increased accuracy. For example, one establishes a temporary identification, ID, after interrogating through all the RF resonant frequencies, $ID_n$ (409). Then, a comparison (410) is made between $ID_n$ and $ID_{n-1}$ which has been stored in the computer memory (411). If these two ID's are the same, then query stops and the identification has been established. If these two ID's are not the same, then $ID_n$ is stored and another query cycle commences. If the identity cannot be established after an arbitrary number of queries, the system stops and sounds an alarm (414).

Given this disclosure, one skilled in the art could practice alternative equivalent embodiments of this invention that arc within the contemplation of the inventors.

We claim:

1. A transponder comprising:
   a resonant circuit having two or more circuit components that determine a resonance frequency of the circuit; and one or more switches, each of the switches transferring at a respective threshold intensity of a local magnetic field created by an externally applied, ramping magnetic field, the resonant frequency of the circuit shifting to a next resonant frequency each time one of the switches transfers.

2. A transponder, as in claim 1, where one or more of the switches shifts the resonant frequency by connecting one or more added circuit components to the resonant circuit.

3. A transponder, as in claim 2, where one or more of the added circuit components is a capacitor.

4. A transponder, as in claim 2, where one or more of the added circuit components is an inductor.

5. A transponder, as in claim 1, where one or more of the switches shifts the resonant frequency by disconnecting one or more deleted circuit components from the resonant circuit.

6. A transponder, as in claim 5, where one or more of the deleted circuit components is a capacitor.

7. A transponder, as in claim 5, where one or more of the deleted circuit components is an inductor.

8. A transponder, as in claim 1, where one or more of the switches is a reed switch.

9. A transponder, as in claim 8, where the reed switch has a first and a second soft magnetic element separated by a gap and the local magnetic field having an intensity greater than the threshold causes the gap to close to establish an electrical contact between the first and second soft magnetic elements.

10. A transponder, as in claim 9, where the reed switch also has a hard magnetic element providing a bias to the first and second soft magnetic elements to change the threshold at which the gap closes.

11. A transponder, as in claim 1, where one or more of the switches has a first magnetostrictive element with an attached end and a free end, the free end separated by a gap from a contact, and the local magnetic field ramping in intensity in a first direction causing the first magnetostrictive element to change in length so that the free end electrically connects with the contact when the local magnetic field passes through the threshold.

12. A transponder, as in claim 11, where the free end electrically disconnects with the contact when the local magnetic field ramps in intensity in a second direction and passes through the threshold.

13. A transponder, as in claim 11, further comprising a hard magnetic element that changes the threshold at which the free end electrically connects with the contact.

14. A transponder, as in claim 1, where one or more of the switches has a first and second magnetostrictive element, each with an attached end and a free end, the free ends separated by a gap, and the local magnetic field ramping in intensity in a first direction causes the first and second magnetostrictive elements to change in length so that the gap closes and the free ends make electrical contact when the local magnetic field passes through the threshold.

15. A transponder, as in claim 14, where the gap opens when the local magnetic field ramping in intensity in a second direction passes through the threshold to electrically disconnect the free ends.

16. A transponder, as in claim 14, further comprising a hard magnetic element that changes the threshold at which the gap closes.

17. A transponder, as in claim 1, where one or more of the switches has a bimorph element with an attached end and a free end, the free end separated by a gap from a contact, and the local magnetic field ramping in intensity causing the bimorph element to bend so that the switch transfers when the local magnetic field passes through the threshold.

18. A transponder, as in claim 1, where one or more of the switches has a first and a second bimorph element each with an attached end and a free end, the free ends separated by a gap from one another, and the local magnetic field ramping in intensity causing the bimorph elements to bend so that the switch transfers when the local magnetic field passes through the threshold.

19. A transponder, as in claim 1, where one or more of the switches has two or more elements capable of making electrical contact, each of the elements positioned non parallel to one another.

20. A transponder, as in claim 1, where one or more of the switches is a master switch that is capable of electrically connecting and disconnecting one or more other switches to the resonant circuit.

21. A method of communication with a transponder in a field of a base station, comprising the steps of:

ramping a magnetic field;

sweeping a radio frequency carrier through a frequency range at a sweep frequency simultaneously with the magnetic field, the frequency range including a set of frequencies called a frequency set;

sensing a return signal, being a background signal, when the radio frequency carrier is not at one of the frequencies in the frequency set;

sensing the return signal, being a resonance frequency, when the radio frequency carrier is at one of the frequencies in the frequency set; and storing a code that indicates if the resonance frequency is different from the background signal at each of the frequencies in the frequency set.

22. A system for interrogating one or more transponders, comprising:

a resonant circuit in the transponder having two or more circuit components that determine a resonance frequency of the circuit and one or more switches, each of the switches capable of transferring to electrically connect and disconnect one or more switched circuit components to the resonant circuit, the switched circuit components shifting the resonance frequency of the resonant circuit to a next resonant frequency when the switch transfers;

a base station further comprising:

an emitter unit that ramps a magnetic field to cause a range of local magnetic field intensities at a location of the transponder and simultaneously sweeps a radio frequency carrier through a frequency range, the frequency range having one or more frequencies in a frequency set;

a detection unit that detects a return signal from the transponder, the return signal being a background signal when the radio frequency carrier is not at one of the frequencies in the frequency set and a resonant frequency signal when the radio frequency carrier is at one of the frequencies in the frequency set; and a memory storing a code that indicates that the resonant frequency signal is different than the background signal at one or more frequencies in the frequency set when the switch transfers because the local magnetic field has passed through a threshold intensity.

23. A transponder comprising:

a resonant circuit means for resonating at two or more resonant frequencies, the resonant circuit means having two or more circuit components that determine a resonance frequency of the circuit; and one or more switch means for transferring at a respective threshold intensity of a local magnetic field created by an externally applied, ramping magnetic field, the resonant frequency of the circuit shifting to a next resonant frequency each time one or more of the switches transfers.

24. A system for interrogating one or more transponders, comprising:

a resonant circuit means for resonating at two or more resonant frequencies, the resonant circuit means being in the transponder and having two or more circuit components that determine the resonance frequency of the circuit and one or more switch means, each of the switch means capable of transferring to electrically connect and disconnect one or more switched circuit components to the resonant circuit means, the switched circuit components shifting the resonance frequency of the resonant circuit to a next resonant frequency when the switch means transfers;

a base station further comprising:

an emitter means for ramping a magnetic field to cause a range of local magnetic field intensities at a location of the transponder and simultaneously sweeps a radio frequency carrier through a frequency range, the frequency range having one or more frequencies in a frequency set;

a detection means for detecting a return signal from the transponder, the return signal being a background signal when the radio frequency carrier is not at one of the frequencies in the frequency set and a resonant frequency signal when the radio frequency carrier is at one of the frequencies in the frequency set; and a memory means for storing a code that indicates that the resonant frequency signal is different than the background signal at one or more frequencies in the frequency set when the switch transfers because the local magnetic field has passed through a threshold intensity.

* * * * *